UNITED STATES PATENT OFFICE.

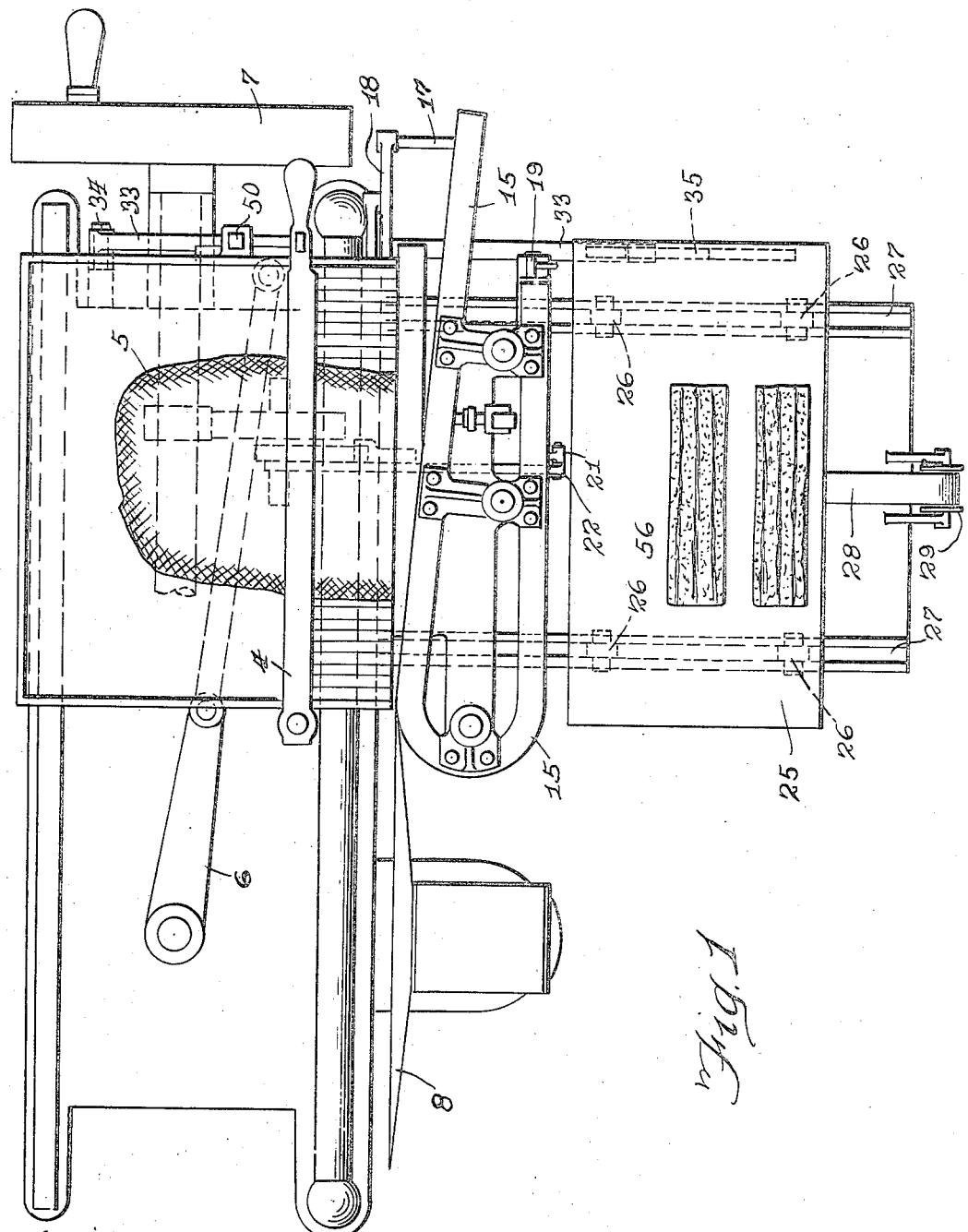

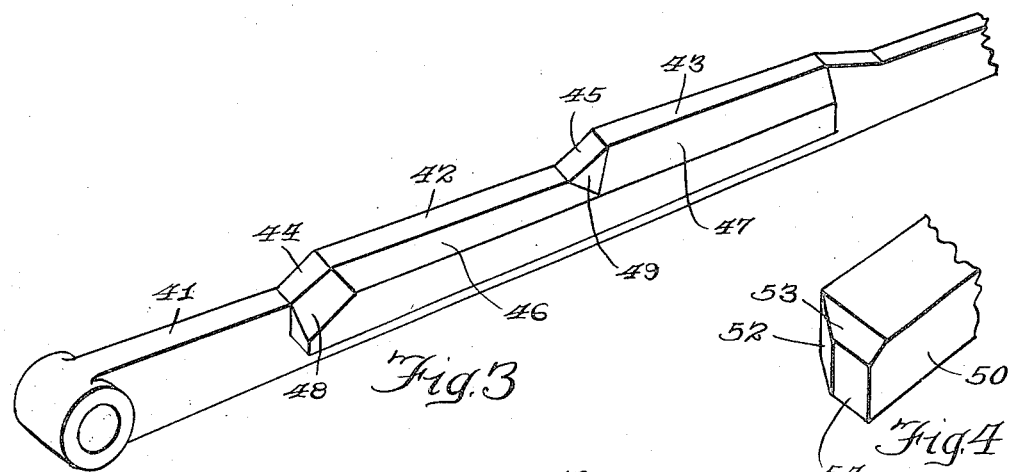
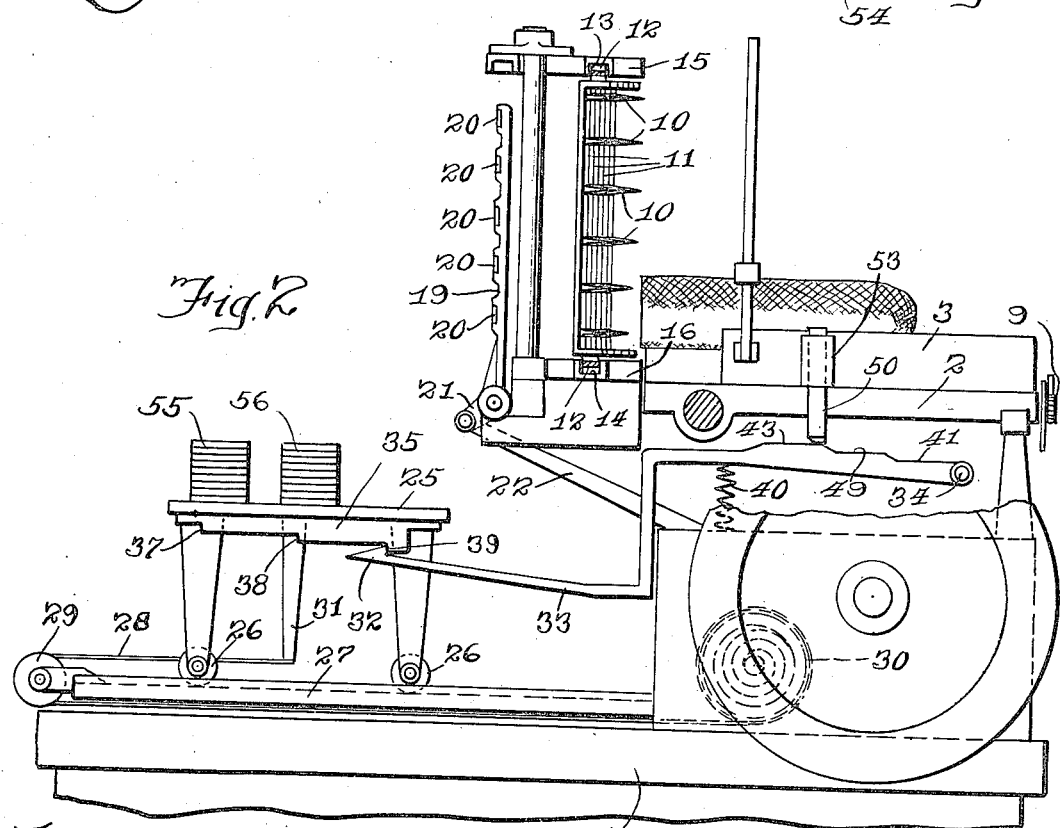

CORNELIS F. M. VAN BERKEL, OF LAPORTE, INDIANA, ASSIGNOR TO U. S. SLICING MACHINE COMPANY, OF LAPORTE, INDIANA, A CORPORATION OF INDIANA.

STACK-SPACER FOR SLICING-MACHINES.

1,310,262.  Specification of Letters Patent.  Patented July 15, 1919.

Application filed October 10, 1917. Serial No. 195,685.

*To all whom it may concern:*

Be it known that I, CORNELIS F. M. VAN BERKEL, a subject of the Queen of the Netherlands, and a resident of Laporte, in the county of Laporte and State of Indiana, have invented certain new and useful Improvements in Stack-Spacers for Slicing-Machines, of which the following is a specification.

The object of this invention is to provide mechanism of the character named which shall be of improved construction and more efficient, economical, and convenient in operation than devices of a similar nature previously known.

The construction is exemplified in the combination and arrangement of parts shown in the accompanying drawings and described in the following specification, and it is more particularly pointed out in the appended claims.

In the drawings:—

Figure 1 is a top plan view of a slicing machine showing one embodiment of the present invention applied thereto.

Fig. 2 is an elevation of the machine shown in Fig. 1;

Figs. 3 and 4 are fragmentary perspective views showing details of construction.

This invention may be applied to slicing machines of various kinds and is shown in the drawings as applied to one of the forms of such machines, which is well known in the art. The machine there shown is provided with a supporting frame 1 upon which a reciprocating meat table 2 is mounted, the table 2 being provided with a meat plate 3 arranged to slide upon the reciprocating table 2 at right angles to the direction of reciprocation thereof. The meat plate 3 is provided with a clamp 4 for holding the meat or other material to be sliced, shown at 5, in place. A reciprocatory motion is imparted to the table 2 by means of a crank 6 driven in a well known manner by a hand wheel 7. The reciprocation of the table 2 moves the meat into engagement with the knife 8, by means of which the slices are cut, and the meat is fed forward the thickness of a slice by the meat plate 3 once for each reciprocation of the meat table. The feeding movement of the meat plate is accomplished by a ratchet device shown at 9 in the drawings, which may be of any one of a number of well known forms of construction.

The slices as they are cut by the knife 8 are received on pointed tines 10 which are mounted on upright bars 11 which connect a pair of chains 12, the links of which are guided in grooves 13 and 14 in upper and lower guide plates 15 and 16 respectively. The bars 11 are connected by a pin 17 and a lever 18 with the reciprocating table 2, so that the tines 10 move in unison with the meat 5 during a slicing operation and are caused to pierce the slice as it is formed and thus to support the slice and conduct it around the curved end of the guides 15 and 16. A pivoted fly 19 is provided with a series of fingers 20 which enter between the prongs 10 behind the slice of meat when the slice is carried around the curved portions of the guides 15 and 16 to the front side of the slice receiving portion of the machine. The fly 19 is caused to rotate about its pivotal support by a lever 21 and a link 22, the link being operated by cam mechanism connected with the main drive shaft of the machine. The arrangement is such that the fly 19 will be moved into a horizontal position at the time that the slice is brought by the tines 10 to the front of the slice receiving portion of the machine, and thus the slice will be swung into a horizontal position and discharged downwardly from the fly 19, and thus stacked upon any horizontal platform that may be provided for receiving slices. This slice stacking mechanism forms the subject matter of my co-pending application, Serial No. 178,734, and is fully described and claimed therein.

In practice the amount of meat which can be sliced from a given piece without re-adjustment of the clamp on the sliding meat plate is usually about five inches and in some forms of meat, such as bacon, in which the slices are comparatively narrow, it is not practical to form a stack of slices of a height equal to the amount which can be cut from the original piece without re-adjustment. In fact, about two inches is the maximum height to which narrow slices of bacon can be stacked without danger of the stack falling over. The present invention provides an arrangement whereby the slices, which are formed during a single series of forward movements of the feed table, are distributed into a number of separate stacks, so that each stack will contain only as many slices as will easily remain in position, without danger of causing the stack to fall over. In the form of the invention shown in the drawings, the mechanism is arranged to divide the slices formed from the piece of meat, during the forward movement of the meat plate, into three stacks which would make each stack have a height of one and two-third inches, assuming that the meat plate has a forward movement of five inches.

To accomplish the distribution of the slices into a plurality of stacks, a platform 25 is arranged to receive the slices as they are discharged by the fly 19 and is supported on rollers 26 which travel on guideways 27 formed on the upper surface of the main frame 1. A belt 28 passes around a pulley 29 carried at the outer edge of the platform 1 and has its inner end secured to a spring drum 30 mounted on the rear portion of the machine frame. The belt 28 is connected to the platform 25 by a downwardly extending arm 31 and the tendency of the spring drum 30 is to draw the platform 25 toward the left, as viewed in Fig. 2. The platform 25 is held against movement under the influence of the drum 30 by a catch 32 on the end of an arm 33 which is pivoted at 34 to the frame of the machine. A block 35 is secured to the under surface of the platform 25 and is provided with a series of shoulders 37, 38 and 39 against which the catch 32 rests to hold the platform 25 from outward movement. A spring 40 presses the catch 32 into engagement with the shoulders on the block 35. The upper edge of the rear portion of the arm 33 is shaped as shown in Fig. 3 and is provided with three horizontally extending surfaces 41, 42 and 43, there being inclined shoulders 44 and 45 between the horizontally extending portions of the upper surface of the arm. Extending inwardly from the horizontal surfaces 42 and 43 are portions of the arm 46 and 47 respectively, which are beveled inwardly and downwardly, and similar beveled portions 48 and 49 lie adjacent the inclined shoulders 44 and 45. A downwardly extending bar 50 is connected by a bracket 51 to the sliding meat plate 3 and the lower end of the bar has its forward portion beveled, as shown at 52 in Fig. 4 of the drawings, and its outer edge beveled as shown at 53. The squared end portion 54 of the bar 50 is arranged to rest upon the surfaces 41, 42 or 43 when the reciprocating table 2 is at its extreme position to the right, as shown in Fig. 1.

At the beginning of a slicing operation the piece of meat is clamped upon the meat plate 3 by the clamp 4 and the platform 25 is pushed inwardly until the catch 32 engages the shoulder 37. This will bring the platform 25 into position to receive slices from the fly 19 near its forward edge to form a stack of slices shown at 55 in the drawings. During this period of the operation of the machine the bar 50 will be adjacent the surface 41 of the lever 33 and will pass over the top of that surface at each return of the reciprocating table 21 to its starting position. As the meat plate 3 is fed forwardly by the ratchet mechanism 9, the bar 50 will move toward the surface 42 until finally the end of the bar will strike this portion of the lever 33. This may occur on the return movement of the table 2, or on the forward feeding movement of the meat plate, depending upon the relative arrangement of the parts of the machine. If the contact takes place during the return movement of the reciprocating table, the bar 50 will first engage the inclined surface 46 or 48 and will force the bar 33 downwardly as it moves across this surface. This movement will release the catch 32 from the shoulder 37 and permit the platform 25 to move forwardly until the catch engages the shoulder 38. This will shift the platform 25 so that a stack of slices will be formed in the position shown at 56 in the drawings. If the bar 50 should strike the lever 33 during the feeding movement of the meat plate 3, while the reciprocating table 2 is in its starting position, the contact will occur upon the inclined shoulder 44, but the result will be the same and the bar 33 will be depressed to release the table 25, as previously described. Further forward movement of the meat plate 3 will bring the bar 50 into engagement with the surface 43 which will again release the catch 32 and permit the platform 25 to move forwardly into the third position, which is the position shown in Fig. 2 of the drawings. In this position a third stack will be formed upon the platform 25 in the rear of the two stacks shown. When the meat plate 3 reaches its extreme forward position the ratchet mechanism will be caused to cease to feed the meat plate forwardly by mechanism well known in the art, and the meat plate will then be returned by the operator to its initial position and the meat re-adjusted in the clamp, ready for a new series of cuts. At the same time the slices upon the platform 25 may be removed and the table returned to its initial position. If at any time during a series of slicing operations, the platform 23 is returned to its original position, after it has been released by the bar 50, so as to cause the slices to be deposited on one of the stacks already completed, the bar 50 will engage one of the inclined surfaces 46 or 47 upon the first return of the reciprocating table to its starting position and the platform will thus be automatically returned to its proper position, corresponding to the position of the meat plate upon the reciprocating table.

In order that the bar 33 may thus be tripped, even though the catch 32 is in engagement with the shoulder 37, when the meat plate 3 is in a forward position so that the bar 50 is opposite the beveled portion 47, it is necessary that the beveled portion 47 shall extend downwardly a sufficient distance to receive the end of the bar 50, even though the lever 33 is in its extreme upper position. For this reason, it will be seen from Fig. 3 of the drawings, that the beveled portion 47 extends downwardly to a position in alinement with the lower portion of the bevel 46. This arrangement will also prevent injury which might result from contact between the bar 50 and the lever 33, such as might occur if the bevel 47 was less extensive and operations were started with the meat plate in a forward position and the platform 25 in its rearmost position. Should this occur with the construction shown in the drawings, the bevel 47 would move the lever 33 downwardly an amount corresponding to two notches in the bar 35 and the platform 25 would be moved into the position shown in Fig. 2.

I claim:

1. In combination, a slicing machine, means for operating said machine, and mechanism operated by said machine operating means for arranging slices formed by said machine in a plurality of separate stacks.

2. In combination, a slicing machine, a device for receiving slices formed by said machine, and automatic means for shifting the position of said receiving device after a plurality of slices have been deposited thereon in one position of said receiving devices.

3. In combination, a slicing machine having a meat holder thereon, means for operating said machine, mechanism for feeding said meat holder through a limited course, means for severing a plurality of slices from the meat on said holder during the feeding of said holder through said course, and means operated by said machine operating means for depositing said slices in a plurality of stacks.

4. In combination, a slicing machine having a meat holder thereon, means for moving said meat holder step by step over a limited course, means for severing a slice from a piece of meat upon said holder for each step in the feeding movement thereof, and means for collecting the slices, formed during a series of step by step movements, in a plurality of separate stacks, said stacks being formed successively.

5. In a slicing machine, a meat holder, mechanism for imparting a step by step movement to said holder to feed the material thereon to a slicing knife, a platform for receiving slices formed by said knife, and mechanism for shifting said platform after a plurality of slices have been deposited in a stack upon said platform to change the position in which slices are deposited on said platform so that the slices formed during a single series of feeding movements of said meat holder will be arranged in a plurality of stacks.

6. In combination, a slicing machine having a slicing knife and a holder for feeding material to said knife, means for discharging slices formed by said knife, a platform for receiving said slices, mechanism for shifting the position of said platform, and means controlled by the feeding movement of said holder for causing the operation of said shifting means after a plurality of slices have been deposited in one position upon said platform.

7. In combination, a slicing machine having a slicing knife, a holder for feeding material to said knife, mechanism for imparting a series of step by step movements to said holder, means for receiving slices formed by said knife, and mechanism for distributing the slices on said receiving means into a plurality of separate piles, with a plurality of slices in each pile.

8. In combination, a slicing machine having a meat holder thereon, means for shifting the position of said meat holder, means for receiving slices formed by said machine, and mechanism controlled by the movement of said meat holder for changing the position in which slices are deposited on said slice receiving means.

9. In combination, a slicing machine having a slicing knife, a meat holder, means for shifting the position of said meat holder for feeding material to said knife, a receiver for slices formed by said knife, and mechanism controlled by said meat holder for changing the position in which slices are deposited upon said slice receiver.

10. In combination, a slicing machine having a slicing knife, a meat holder, means for imparting a step by step movement to said meat holder to cause said holder to feed material to said knife, a platform for receiving slices severed from said material, means for shifting said platform, and mechanism controlled by said meat holder to cause said shifting mechanism to operate after a series of step by step movements of said holder and after a plurality of slices have been deposited in a stack upon said platform.

11. In combination, a slicing machine having a slicing knife, a reciprocating table, a meat holder slidably mounted upon said table, means for imparting a step by step movement to said meat holder to cause said holder to feed material therein relative to said slicing knife, a receiver for slices severed from said material, and mechanism for changing the position in which slices are deposited on said receiver to cause the slices formed during a series of movements of said meat holder to be arranged in a plurality of stacks upon said receiver.

12. In combination, a slicing machine, a platform for receiving slices formed by said machine, means for shifting said platform to change the position in which slices are deposited thereon, and mechanism for controlling said shifting means to regulate the height of a stack of slices upon said platform.

13. In combination, a slicing machine, a meat holder, mechanism for imparting a feeding movement to said meat holder, a platform for receiving slices formed by said machine, means for shifting said platform to change the position in which slices are deposited thereon, a catch for controlling said shifting means, a stop member having a plurality of steps for controlling said catch, and means operated by said meat holder for engaging said stop member to operate said catch.

14. In combination, a slicing machine, means for receiving slices formed by said machine, a device for controlling said slice receiving means comprising a stop member having a plurality of steps thereon, a movable meat holder for feeding material to be sliced, and means connected with said meat holder and controlled by the position thereof for selectively engaging said steps to operate said stop member.

15. In combination, a slicing machine having a meat holder thereon, means for imparting a feeding movement to said meat holder, a stop bar having a plurality of steps thereon, means carried by said meat holder for engaging said steps to shift the position of said stop bar in accordance with the position of said meat holder, and means controlled by said stop bar for receiving slices formed by said machine.

16. In combination, a slicing machine having a meat holder thereon, mechanism for imparting a feeding movement to said meat holder, means for receiving slices formed by said machine, mechanism for adjusting said receiving means to change the position in which slices are deposited thereon, and means operated by said meat holder at an intermediate position in the feeding movement thereof for causing an operation of said adjusting mechanism.

17. In combination, a slicing machine having a reciprocating table, a meat holder carried by said table, mechanism for imparting a step by step movement to said meat holder, a slice receiver, mechanism for controlling said slice receiver comprising a trip bar having inclined surfaces thereon, and means carried by said meat holder for engaging said inclined surfaces to operate said trip bar.

18. In combination, a slicing machine having a reciprocating table thereon, a meat holder carried by said table, means for imparting a step by step feeding movement to said meat holder, a platform for receiving slices, resilient means for shifting said platform to change the position in which slices are deposited upon said platform, a catch member arranged to hold said platform against the action of said resilient means in a plurality of different positions, and mechanism for releasing said catch to permit a movement of said platform after a series of feeding movements of said meat holder and after a plurality of slices have been deposited upon said platform.

19. In combination, a slicing machine having a meat holder thereon, mechanism for feeding said meat holder through a limited course to cause a plurality of slices to be severed from the meat on said holder, and mechanism for forming said slices into a plurality of stacks, each stack being formed before another is begun.

In testimony whereof I have signed my name to this specification, on this 8th day of October, A. D. 1917.

CORNELIS F. M. van BERKEL.